United States Patent [19]

Wipkink

[11] 4,212,561
[45] Jul. 15, 1980

[54] MARINE STRUCTURE CONNECTING STRUCTURES AT DIFFERENT LEVELS

[75] Inventor: Johannes Wipkink, Sassenheim, Netherlands

[73] Assignee: Ingenieursbureau Marcon (Marine Consultants) B.V., Leiden, Netherlands

[21] Appl. No.: 916,427

[22] Filed: Jun. 16, 1978

[30] Foreign Application Priority Data

Jun. 17, 1977 [NL] Netherlands .......................... 7706724

[51] Int. Cl.² ............................................... E21B 7/12
[52] U.S. Cl. ..................................... 405/195; 166/367; 166/355; 175/7; 405/202
[58] Field of Search ................ 175/7; 114/293; 9/8 P; 61/202; 405/202, 220; 166/350, 355, 367

[56] References Cited

U.S. PATENT DOCUMENTS

| | | | |
|---|---|---|---|
| 3,355,899 | 12/1967 | Koonce et al. ....................... | 405/202 |
| 3,440,671 | 4/1969 | Smulders ................................ | 9/8 P |
| 3,602,175 | 8/1971 | Morgan et al. ....................... | 175/7 X |
| 3,791,442 | 2/1974 | Watkins ................................ | 166/359 |
| 4,025,976 | 5/1977 | Van Der Landen .................... | 9/8 P |

FOREIGN PATENT DOCUMENTS 1404775 9/1976 United Kingdom .

Primary Examiner—Dennis L. Taylor
Attorney, Agent, or Firm—Sughrue, Rothwell, Mion, Zinn and Macpeak

[57] ABSTRACT

A marine structure for guiding a plurality of ducts from deeper to higher submerged devices such as an oil well at the sea bottom and a production or storage station, respectively. The apparatus provided in accordance with the present invention compensates for relative movement between the higher and lower device by providing a rigid column having pivots at both the higher and lower devices. A plurality of ducts are attached to the rigid column and are connected to a corresponding plurality of higher ducts by similar pivot means. The higher ducts are arranged at the higher device so as to allow for relative longitudinal movement of the higher ducts with respect to the higher device.

12 Claims, 7 Drawing Figures

MARINE STRUCTURE CONNECTING STRUCTURES AT DIFFERENT LEVELS

This invention relates to a marine structure, including a structure at a lower level below the water surface and a structure at a higher position, said two structures being movable with respect to each other, there being a guide structure for a number of ducts for fluids such as oil or gas and/or for transmitting signals for controlling, checking or governing and/or for transmitting energy, said guide structure connecting said lower and higher structures, which guide structure also connects said ducts to ducts connected to said structure at a higher level and on the other hand to parts of said structure at a lower level below the water surface.

Such structures are known in different embodiments. One of the problems encountered therewith is that a number of ducts have to be guided which have to pass a pivoting structure. Of course only one duct can pass through the centre of a pivot structure and this means that, if there is a large number of ducts, a number of ducts not positioned in the centre of the pivot structures should be adapted to take up changes in length when the structures move with respect to each other. This gives considerable difficulties. It is not always possible or preferable to apply bellows, swivels or sliding structures or flexible hoses in such pivot structures. If ducts are used guided through scabbards there may be a simple interruption in the scabbard near the pivot structure, but in mutual movement of the marine structures said interruption will increase and decrease in length so that a duct present in the scabbards and bridging the interruption would rub or chafe along the scabbard wall and thus would give considerable wear.

The present invention aims at obtaining a solution for such and similar difficulties and problems. To this end a marine structure as given in the preamble is according to the invention characterized in that the guide structure is a rigid column having a part connected pivotally at its upper end to a part of the said structure at a higher level and being connected pivotally at its lower end to the said structure at a lower level, said ducts or scabbards therefor extending over the length of the guide structure being rigidly connected thereto and each having pivoting connections at their upper ends, connected to ducts or scabbards of said structure at a higher level which are guided for longitudinal movement by and with respect to said structure at a higher level.

In this way it is possible for all ducts or scabbards for such ducts to have a constant length and they will only make movements parallel to their longitudinal direction, but these can be taken up easily above the water surface through hoses or telescope pipes in a zone where they are easily accessible for inspection, checking and repairs, such hoses or telescope pipes connecting said ducts to other parts of the marine structure at a higher level.

Said structure at a higher level may be a floating or semi-sub platform, a production or storing station and/or a mooring buoy or mooring pier or jetty and the marine structure at a lower level may be an oil well at the sea-bottom, a storing or duct distribution station or a station where the ducts from a number of oil wells unite, a production station or the like.

It is remarked that it is known as such from U.S. Pat. No. 3,677,016 and Netherlands patent application 76.03995 laid open to the public on Oct. 18, 1976, for offshore marine structures to have vertical ducts move longitudinally with respect to a riser structure, by which they are guided, where the riser structure carrying a platform above the sea level is pivotally connected to a structure at the sea bottom and is rigidly connected to the platform. This does not solve the problem where there is also a pivoting connection connecting the guide structure to the structure at the higher level such as a floating or slightly submerged platform which has to maintain a substantially vertical position.

The invention further relates to all kinds of details of the embodiment of such a structure as will appear from the following description and claims and from the enclosed drawings.

The invention will now be explained in more detail with respect to the attached drawings. Therein:

Figure 1:
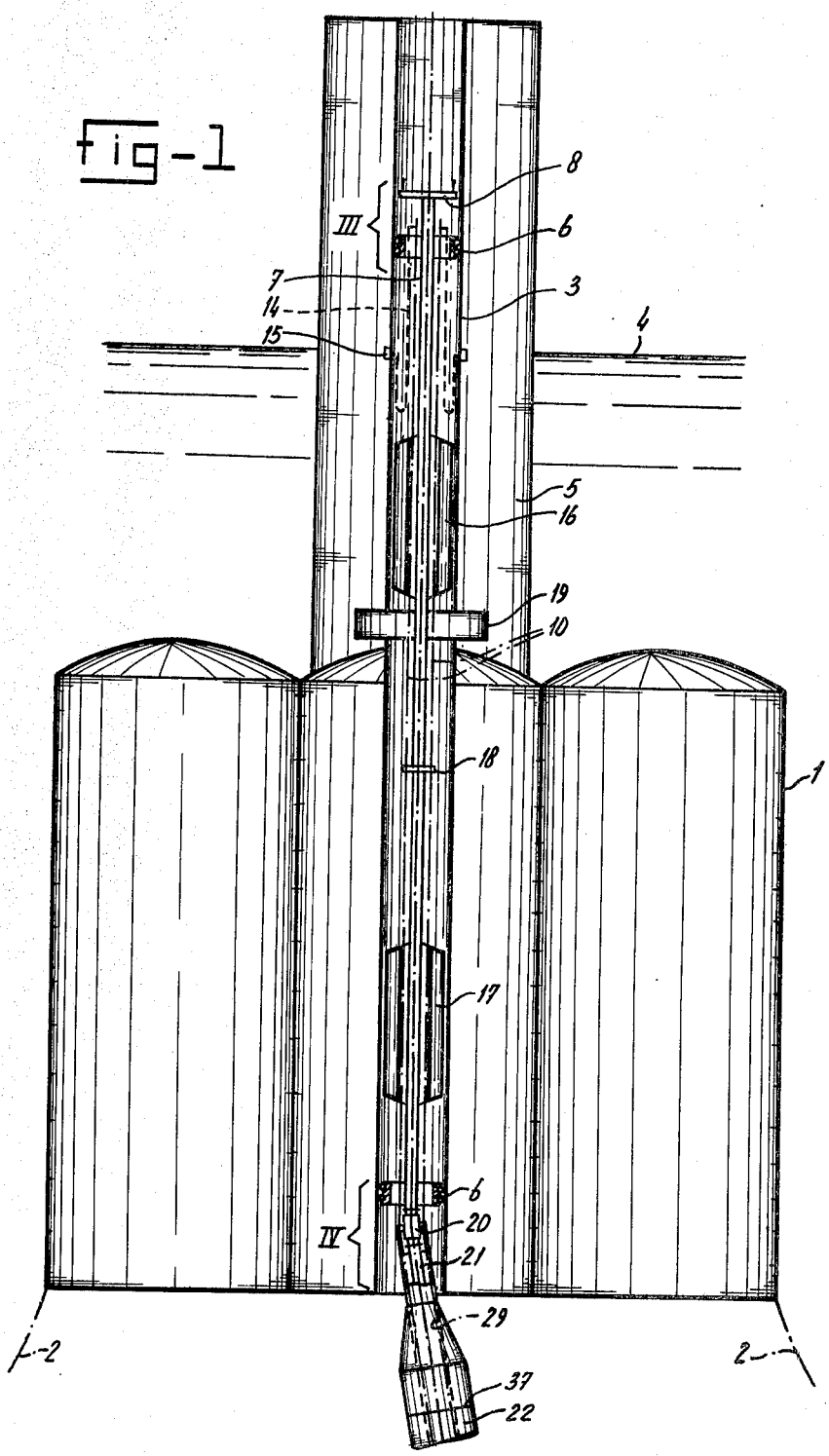
FIG. 1 is a vertical somewhat diagrammatic section through a structure floating at and mainly somewhat below the water surface, constituting a production and storing station for oil.

In FIG. 1 the reference numeral 1 indicates a production—and storing station e.g. for oil floating below the water surface. This station may have its own buoyancy and be anchored to the sea-bottom by guys 2. It may consist mainly of steel or concrete or both and for strength and safety reasons, for being usuable for different functions and for the separate storing of oil it is divided into separate compartments. In the centre of this structure or to one side thereof there is a vertical shaft 3 extending to a point considerably above the main structure of station 1 and to a point above the water level 4. This shaft 3 is surrounded by a shaft 5 in the upper part of the structure, through which ducts or hoses may extend, which are not shown, and such ducts or hoses may extend from ducts within the shaft 3 to the tanks and operating spaces in the station and also from the station e.g. to discharge connections for loading tankers. There may be a suitable platform at the top of the shafts 3,5.

In the shaft 3 a strong central vertical tube 7 is guided by sets or bogeys 6 with wheels. The tube 7 may be a product tube, e.g. for guiding purified and separated oil treated in station 1 downwardly and along the sea-bottom to a riser at a different point e.g. connected to a mooring buoy adapted to discharge this oil to a tanker. At its top this tube 7 carries a work deck 8 (FIG. 3) with openings, always open or covered by lids, to give access to the ducts below it. Ducts 9 extending through scabbards 10 to be described below terminate below deck 8 and having above the upper bogey 6 two valves 11 and 12, between which a duct 13 branches to a hose 14 which at 15 (FIG. 1) gives connection to a duct not shown in shaft 5. If both valves 11 and 12 are opened, the duct 9 is immediately accessible straight downwardly from above, e.g. to pump tools therethrough from means to be provided on the work deck 8 (with so-called TFL-systems (through flow line)).

The central tube 7 has two floats 16 and 17 in shaft 3, connected rigidly to said tube and provided with throughgoing openings for allowing scabbards 10 to pass therethrough with vertical and with some horizontal possibility of relative movement. Said tube 7 moreover carries a flange or a set of spokes 18 which allows supporting of the tube 7 in its highest position by temporary beams which may be slid below said flange or spokes, such beams being supported in and on the floor of a wider space 19 around shaft 3 in shaft 5 (FIG. 1).

Below the lowest bogey 6 the central tube 7 has a spherical pivotable connection 20 with a central tube 21 of a pivoting guide structure 22 which extends downwardly to a point near the bottom of the water (FIG. 2), where it merges into a pivot structure 23 with two mutually perpendicularly crossing or intersecting pivot axes 24 and 25 which may be embodied in the manner as given in Netherlands patent application 75.01851. The pivot axis 25 gives connection to a lower support structure 26 resting on a foundation 27 supported on the sea-bottom. The foundation 27 carries parts 28 for guiding ducts or scabbards.

Figure 2:
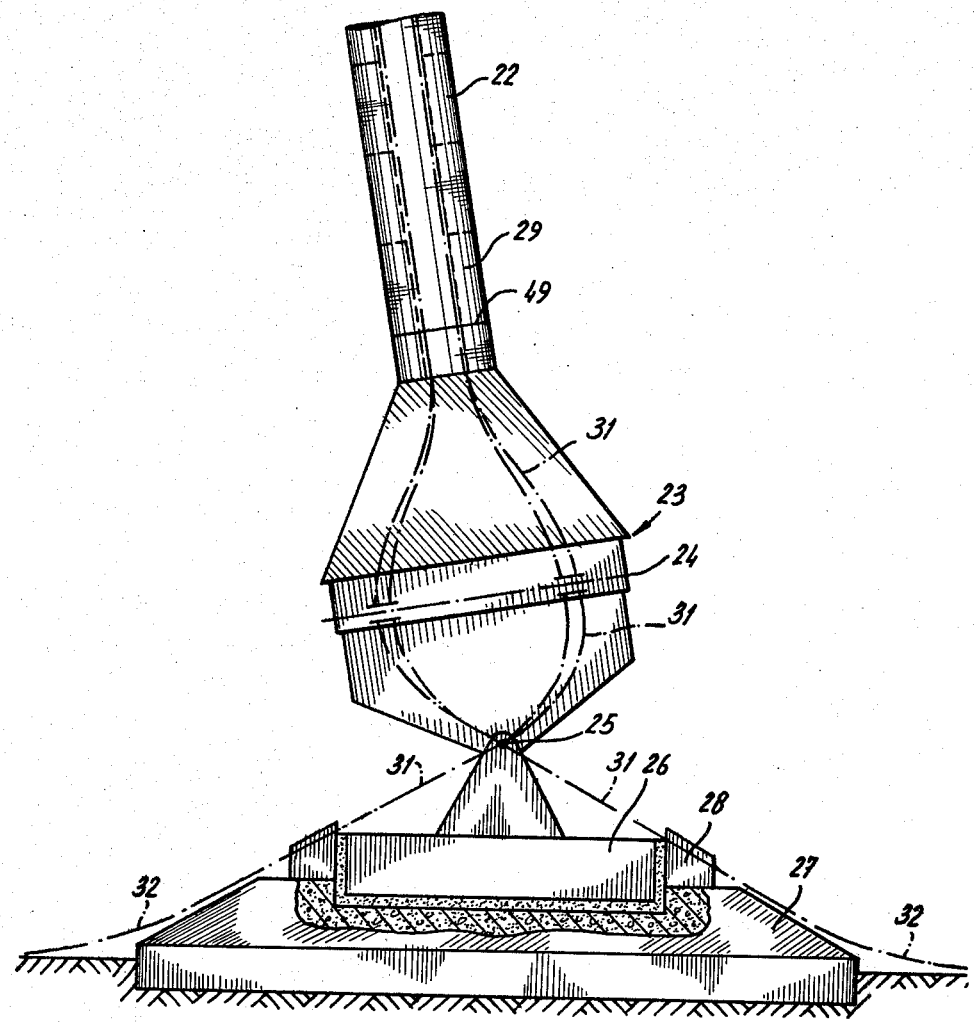
FIG. 2 is a somewhat diagrammatic elevation of a structure near the sea-bottom, connected to the structure of FIG. 1 near the water surface by a guide structure for ducts of which the upper part is shown in FIG. 1 and the lower part is shown in FIG. 2.
Figure 3:
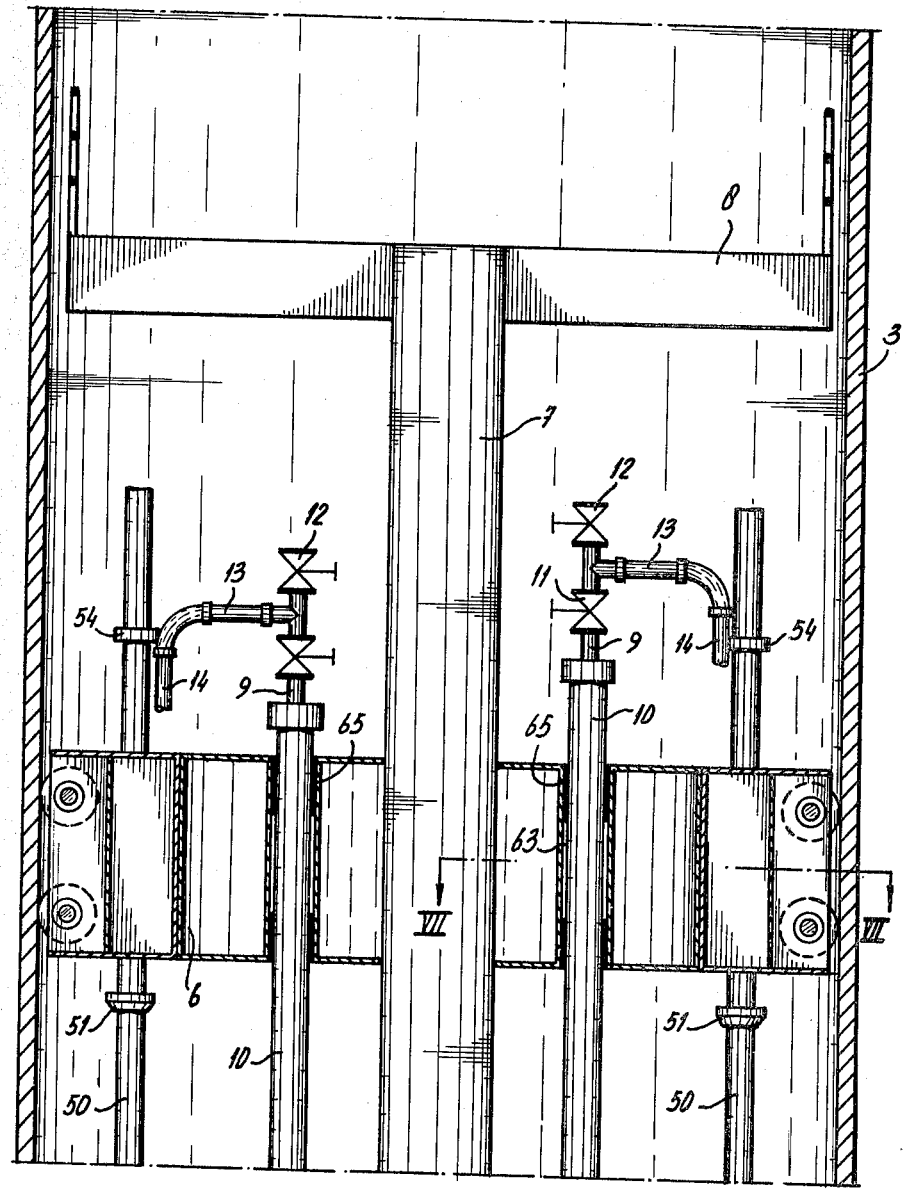
FIG. 3 is a vertical section and elevation of part III in the upper part of FIG. 1 at a larger scale and in more detail.
Figure 4:
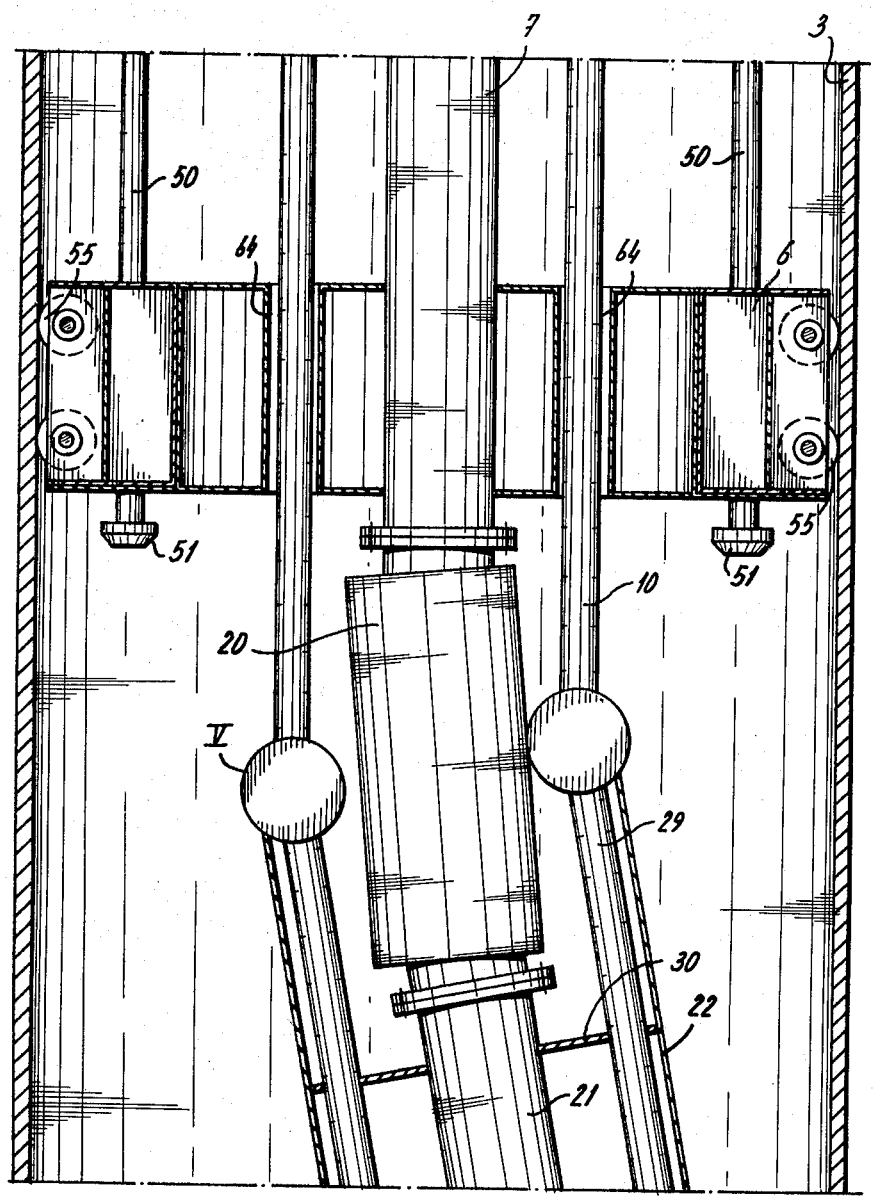
FIG. 4 is a vertical section and elevation of part IV at the lower end of FIG. 1 at a larger scale and in more detail.

The ducts 9 (FIG. 3) as mentioned have to pass the pivot structure at the lower end of shaft 3 to the guide structure 22 in such a way as to pivotable and they also have to pass the pivot structure 23 of FIG. 2. In the example as shown these ducts are taken up in scabbards which, insofar as present in shaft 3, are indicated by 10. In structure 22 there are scabbards 29 for such ducts 9, which scabbards 29 are rigidly connected to said structure 22 and to the tube 21 therein by transverse walls 30 (FIG. 4). In the pivot structure 23 (FIG. 2) said scabbards are indicated by 31. They are guided by the guide parts 28 on the foundation and then continue as ducts or scabbards 32 extending on the sea-bottom or on suitable supporting structures on or just above the sea-bottom to oil or gas wells, manifold structures for ducts, valve structures etc., which possibilities are well known to the expert.

Figure 5:
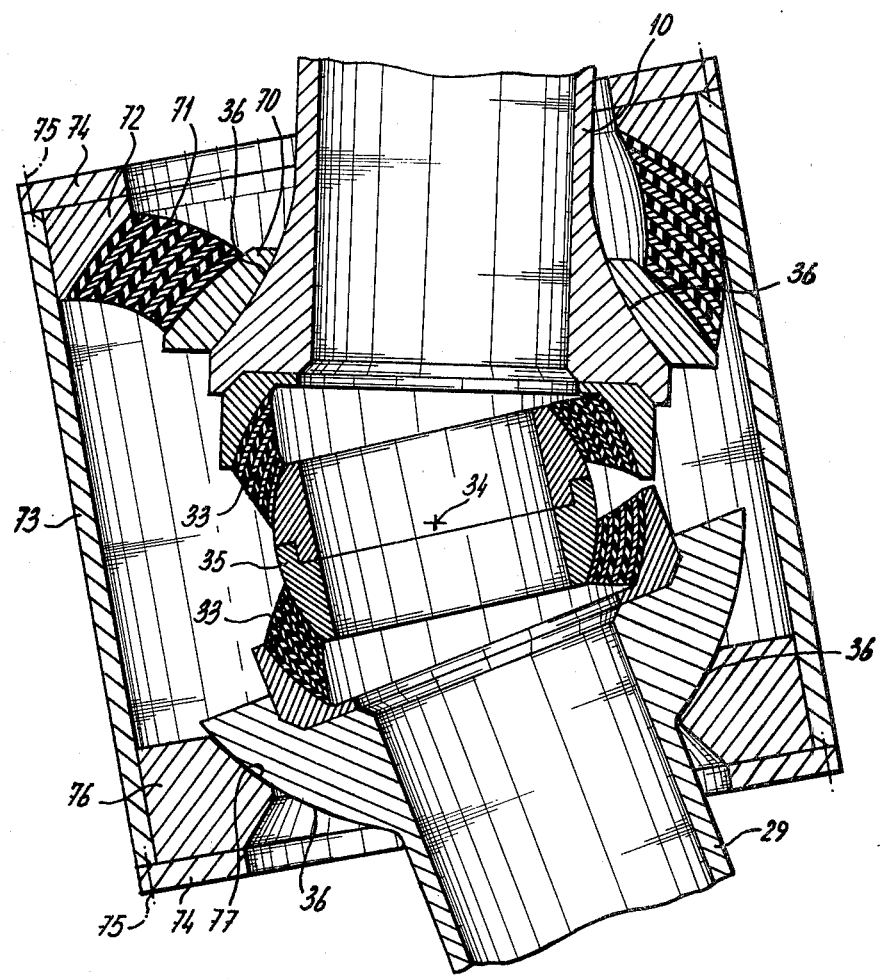
FIG. 5 is a vertical section at a larger scale of detail V in FIG. 4.

The scabbards 10 and 29 approach each other close to and around the spherical bearing 20 in the central tube 7,21 (FIG. 4). In this figure and in FIG. 5 it has been shown how these parts may be connected here. It is important in this respect that the scabbards 10 can transmit the vertical forces by their weight either on the scabbards 29 or on other parts of the structure 22. In the embodiments shown in FIGS. 4 and 5 use is made of so-called elastomeric flexible connections, having at 33 alternating annular layers of elastomeric material such as artificial rubber and metal bonded together by adhesive or vulcanizing or curing, such layers being spherical with the same centre 34. At their outer surface such sandwich-structures are rigidly connected to parts connected to scabbard 10 and scabbard 29 and at their inner surface they are rigidly connected to a ring 35 in two parts with a spherical outer surface with the same centre 34. Another embodiment may also be chosen as it is not absolutely necessary that the scabbards 10 and 29 are connected sealingly if only they are connected in such a way as to transmit vertical forces particularly downwardly as a separate duct will extend through these scabbards which will be flexible and have a sealing function itself, such as a hose. If desired or necessary in view of axial tensile forces, e.g. by a high pressure of the fluid in the duct, it is also possible to apply a connection which is also adapted to transmit tension in axial direction, e.g. by positioning rings with spherical surfaces on the surfaces 36 of the scabbards etc., which will be described below. Such a tension transmitting connection may also be applied for spherical bearing 20 in the connection for the central duct 7,21. For this reason, this spherical bearing 20 is in FIG. 4 shown as a sleeve surrounding the bearing. In FIG. 5 it is shown how such structures may be embodied. In the top part of FIG. 5 the curved surface of scabbard 36 carries a ring 70 connected to a laminate 71 of layers of alternating elastomeric material and metal plates, all of spherical shape with their centre of curvature in the centre 34 and this laminate is at its outside connected to a ring 72. This ring is enclosed within a sleeve 73 having an end ring 74 connected thereto as by bolts 75.

In the lower part of FIG. 5 another possibility is shown, where the surface 36 of scabbard 29 is convex and spherically curved with the centre in centre 34, cooperating with a ring 76 having a concave inner surface 77, enclosed within sleeve 73 and held in place by a lower end disc 74 fastened to the sleeve 73 by bolts 75. If desired there may be means such as bearing metal and lubricating provisions for decreasing friction in the contacting surfaces 36 and 77. If no sealing is necessary at all, the laminated rings 33 may be omitted and the spherical outer surface of the ring 35 may immediately be in contact with the concave spherical surfaces of the scabbards now immediately enclosing lamimate 33. Bearing 20 of FIG. 4 may have the same structure as one of these structures shown in FIG. 5. Such structures are well known in the art and are commercially available so that they will not need further description. A known type of such connections and bearings is offered by the U.S. firm Lord Kinematics, for part of such structures manufactured or traded together with the firm Vetco. For structures to be chosen reference is made to well known catalogues, such as the biannual Composite Catalog of Oil Field Equipment and Services, edited by World Oil, Gulf Publishing Company, Houston, U.S.A., for example the catalogue of 1976/1977.

The guide structure 22 may transmit horizontal and vertical forces to bearing 20 through the baffles 30 (FIG. 4). An easy separation of this structure 22 in plane 37 (FIG. 1) is provided, but this does not form part of the invention. Such separating structures are generally known, e.g. U.S. Pat. No. 3,222,089, 3,321,217, 3,330,341, 3,354,951, 3,500,914, 3,516,492 and 3,516,492. The tube 21 is taken up in and supported by the outer wall of the tube 22 by horizontal baffles 30, so that said outer wall takes up all important structural forces. If used as a product line the tube 21 may serve as a scabbard for a separate duct which has not been shown and which extends therethrough. It is also possible to guide a number of ducts through tube 21, either separately supported or suspended or guided and locally secured in scabbards therein.

the scabbards 29 are also supported by the baffles 30. Between all such baffles or part thereof buoyancy tanks may be formed to give to structure 22 sufficient buoyancy, also below the separating plane 37, so that the loads therein are decreased and the structure tends to take up an upright position, also if the part above the separating plane 37 has been taken away, so that thereafter the connection in plane 37 may easily be made again. Such tanks or parts thereof may also serve as ballasting tanks, in particular to facilitate positioning, lowering and mounting of the structure.

At the lower end of structure 22, at 49 in FIG. 2, this structure may have a similar possibility of division as in the plane 37 as just described.

Figure 6:
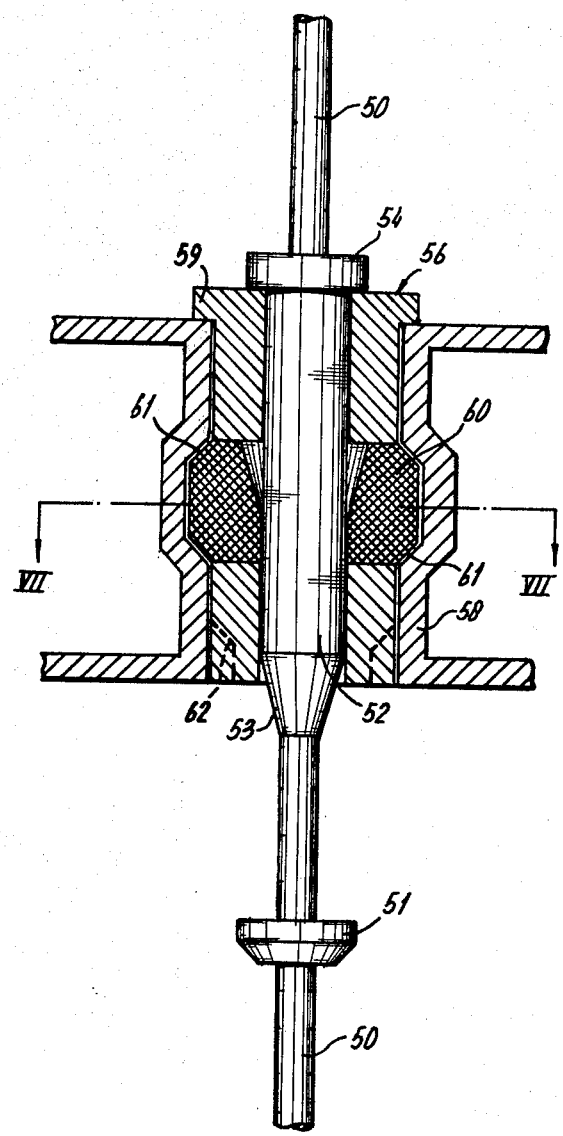
FIG. 6 shows a detail of the structure in vertical section from the right end part of FIG. 3.
Figure 7:
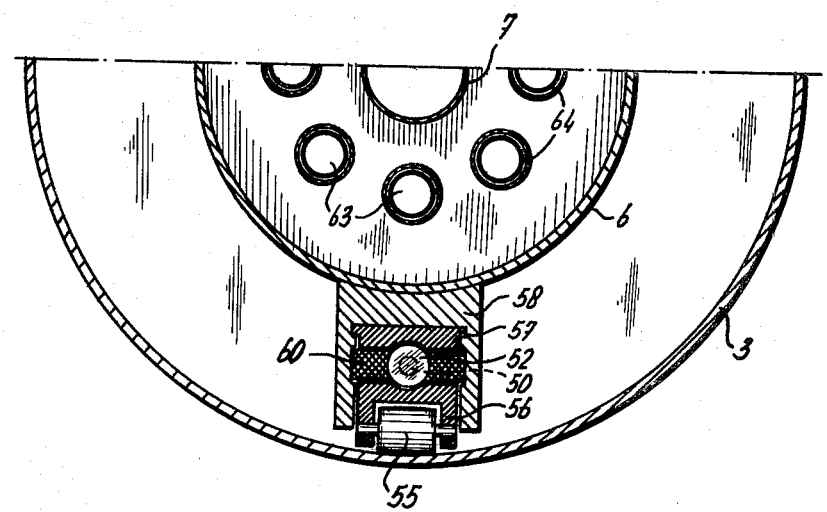
FIG. 7 shows a horizontal section through this structure according to the line VII—VII in FIGS. 3 and 6.

In FIG. 6 a vertical section is shown through part of the bogeys 6 to show how the wheels may be secured in place and removed for inspection, repair and replacement. FIG. 7 gives a horizontal section along the line VII—VII in FIG. 3 and 6. A number of vertical rods 50 extend through the shaft 3 and below each bogey they each have a head 51 and they terminate in such a head 51 below the lowest bogey. Each rod 50 has thicker parts 52 with a conical lower transition part 53 and an upper collar 54. The wheels 55, in this case two above each other, are taken up in wheel casings 56 guided vertically by protruding parts 57 in a casing 58 connected rigidly to the central tube 7. At their upper end these wheel casings for the upper bogey 6 have a flange 59 adapted to rest on casing 58, but there is no such flange for the lower bogey. In the wheel casings 56 there are two locking blocks 56 to both sides of rod 5, fitting in recesses in casing 58 with inclined upper and lower surfaces 71 on said blocks and in said recesses.

The operation of this structure is as follows: In the position of FIG. 6 and 7 the locking blocks 60 are rigidly enclosed by the thicker part 52 of the rod 50 to become locked in the recesses in casing 58. The wheels are thus as to their support rigidly connected to the casing 58 and the further rigid structure of the bogey and thus also with the central tube 7, so that these wheels can rotate but not make other movements. If it is desired to loosen the wheels the concerning rod or rods 50 are moved upwardly by pulling from work deck 8 or from the upper surface of the upper bogey 6. As central tube 7 keeps the casings 58 of the bogeys in their position, the rod 50 is moved so that the thicker part 52 leaves the wheel casings 56 upwardly and the locking blocks 60 are thus liberated to be able to move inwardly. The head 51 of rod 50 now reaches the lower surface of the wheel casing 56 to move this upwardly with further upward movement of the rods, so that the inclined faces 61 push the locking blocks inwardly as they have an angle of inclination which is selfloosening.

As in the lower bogey there is no flange 59 on the wheel casings 56, it is possible that said wheel casings pass through the openings for the upper wheel casings upwardly.

If the wheel casings have to be brought in place again, lowering of the rods 50 will lower the upper wheel casings until their flanges 59 come to rest on casing 58. The lower wheel casings have a narrower lower end 62 as given by dotted lines in FIG. 7 and the lower casing 58 has a corresponding restriction, by which complementary surfaces the lower wheel casings 56 are taken up in the correct vertical position. Further downward movement of rod 50 gives a downward and outward pressure by cone 53 to push the locking blocks 60 radially outwardly in the recesses in casing 58, until the thicker rod part 52 encloses these locking blocks entirely as shown in FIG. 6. This is true both for upper and lower bogeys.

FIG. 7 shows circles 63 and 64. The smaller circles 63 show the passage openings in the upper bogey 6, in which the scabbards 10 may be guided by bearing sleeves 65 (FIG. 3). The larger circles 64 show the openings in the lower bogey 6, through which the scabbards 10 have to be movable. As the scabbards are long, they may without any disadvantage be guided correctly in the bearing sleeves 65 of the upper bogey notwithstanding the necessity to have some freedom of horizontal movement near their lower ends at the pivot structure.

A problem may be formed by the fact that the floating structure 1 at the upper level should be able to or is allowed to make some rotating movement about its vertical axis. If this would give too much torsion through the wheels 55 on the structure of the bogeys, on the tube 7 and on structure 22, there may also be wheels with a vertical axis or there may be ball-races or roller-tracks around tube 7 or between casing 58 and the inner ring of bogey 6 shown in FIG. 7 to solve this problem.

If the connection at 37 in structure 22 is interrupted, the buoyancy of the structure above this interruption may be such that the tube 7 moves upwardly in shaft 3 until the flange or spoke structure at 18 in FIG. 1 may be supported by beams in recess 19 for repairs etc. The lower part of structure 22 may be retracted fully into shaft 3 by such buoyancy, so that it does no more protrude downwardly below structure 1, so that when tugging this structure away there is no risk that such protruding parts would give to hit underwater obstacles in shallow waters. If a division has to be brought about in surface 37 it is possible to have easily separable nipples, spigots and the like in ducts extending through the scabbards and suitable valves e.g. check valves closing automatically when such an interruption is made, or remotely controlled valves for closing the duct parts below and above the separation. It is also possible to have ducts extending continuously through the scabbards and passing the interruption at 37 and other interruptions without any interruptions in the ducts themselves, e.g. with only an interruption in the structure 28 on the lower foundation (FIG. 2). In that case the ducts may be loosened from above in known manner and then pulled out upwardly through and from the scabbards before the separation in the structure is made.

I claim:

1. A marine structure for guiding ducts from a deeper to a higher device below water, which devices are adapted to make mutual movements characterized in that said marine structure comprises a rigid column having pivot means both at its upper and at its lower end to give a pivoting connection with the deeper and higher devices respectively, a plurality of said ducts rigidly connected to said column, a plurality of higher ducts therefor having pivoting connections to corresponding ones of said first-mentioned ducts, and guide structure for guiding said plurality of higher ducts for longitudinal movement with respect to said higher device.

2. A structure according to claim 1, characterized in that the pivot means at the upper end of said rigid column connect said rigid column to said guide structure at a higher level, said guide structure guiding the higher ducts therefor while allowing them to move longitudinally with respect thereto.

3. A structure according to claim 2, characterized in that said higher guide structure is a central higher column around which the higher ducts or are positioned, said higher column being surrounded by an upstanding shaft of the said higher device and being guided thereby while allowing free up and down movement of said column in said shaft.

4. A structure according in claim 2, characterized in that the higher guide structure has buoyancy means.

5. A structure according to claim 4, characterized in that said buoyancy means protrude outside the said higher guide structure and have openings to allow passage of the higher ducts positioned around said column with some clearance to allow longitudinal and some slight transverse mutual movements.

6. A structure according to claim 3, characterized in that the said higher column is connected to a wheel structure protruding sideways therefrom and guiding the column in one or more zones along the inner wall of the upstanding shaft.

7. A structure according to claim 6, characterized in that in the highest part of the wheel structure in the shaft, guide sleeves are provided for guiding said ducts slidingly in their longitudinal direction.

8. A structure according to claim 6, characterized in that the higher column has a work deck near its upper end, through which openings allow access to the different ducts, and that there are valves below the work deck and above the wheel structure giving connection at will to transversely directed duct connections for the said higher ducts or to parts to be introduced into them from above from the work deck such as for cleaning, operating, securing and loosening of parts.

9. A structure according to claim 6, characterized in that the wheel structure has wheels with their supports detachably connected to the said higher column, and that there is a rod for fastening and loosening said detachable connection by moving said rod up and down from a higher level.

10. A structure according to claim 1, characterized in that the rigid column with its ducts therefore is divisible easily at a short distance below the pivoting means at the upper end thereof.

11. A structure according to claim 1, characterized in that the rigid column with its ducts therefor is divisible easily at a short distance above the pivoting means at the lower end thereof.

12. A structure according to claim 1, characterized in that at least part of the pivoting connections in the ducts therefore are constituted by spherical metal surfaces at both parts to be pivotally connected, with an elastomeric layer bonded to such metal surfaces betweem them.

* * * * *